(12) United States Patent
Ando (10) Patent No.: US 6,526,020 B1
(45) Date of Patent: Feb. 25, 2003

(54) RING NETWORK SYSTEM, PROTECTION METHOD THEREFOR

(75) Inventor: Naoki Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/262,063

(22) Filed: Mar. 4, 1999

(30) Foreign Application Priority Data

Apr. 28, 1998 (JP) .......................................... 10-117654

(51) Int. Cl.[7] .......................................... H04L 12/437

(52) U.S. Cl. ...................... 370/223; 370/225; 370/238; 370/404; 370/406

(58) Field of Search ............................... 370/222, 404, 370/223, 224, 238, 231, 232, 258, 406

(56) References Cited

U.S. PATENT DOCUMENTS

| | | | | |
|---|---|---|---|---|
| 5,081,452 A | * | 1/1992 | Cozic ......................... | 370/223 |
| 5,355,362 A | * | 10/1994 | Gorshe et al. .............. | 370/222 |
| 5,442,623 A | * | 8/1995 | Wu ............................. | 370/224 |
| 5,469,428 A | * | 11/1995 | Tokura et al. .............. | 370/224 |
| 5,475,676 A | * | 12/1995 | Takatori et al. ............. | 370/217 |
| 5,815,489 A | * | 9/1998 | Takatori et al. ............. | 370/217 |
| 5,956,319 A | * | 9/1999 | Meli .......................... | 370/224 |
| 6,088,141 A | * | 7/2000 | Merli et al. ................. | 359/110 |
| 6,269,452 B1 | * | 7/2001 | Daruwalla et al. ............. | 714/4 |
| 6,278,689 B1 | * | 8/2001 | Afferton et al. ............ | 370/223 |

FOREIGN PATENT DOCUMENTS

| | | |
|---|---|---|
| JP | 09/509028 | 9/1987 |
| JP | 05-91103 | 4/1993 |
| JP | 06-37779 | 2/1994 |
| JP | 09-98180 | 4/1997 |

OTHER PUBLICATIONS

Y. Kajiyama, N. Tokura, and K. Kikuchi, "An ATM VP–Based Self–Healing Ring", IEEE vol. 12, No. 1, Jan. 1994, pp. 171–178.*
M. Clouqueur, and W. D. Grover, "Availability Analysis of Span–Restorable Mesh Networks", IEEE vol. 20, No. 20, May 2002, pp. 810–821.*
E. Modiano, and A. Narula–Tam, "Survivable Lightpath Routing: A New Approach to the Design of WDM–Based Networks", IEE vol. 20 No. 20, May 2002, pp. 800–809.*
D. Zhou, and T. H. Lai, "Backup Group Multiplexing: An Integrated Restoration Strategy for IP over WDM Optical Networks", IEEE 2001, pp. 235–240.*
S. Vutukury, and J. J. Garcia–Luna–Aceves, "A Distance–Vector Multipath Routing Protocol", IEEE 2001, pp. 557–564.
B. Mans, and N. Santoro, "Optimal Elections in Faulty Loop Networks and Applications", IEEE vol. 47, No. 3, Mar. 2001, pp. 286–297.
H. M. Dao, and C. B. Silio, "Ring–Network with a Constrained No. of Consecutively–Bypassed Stations", IEEE vol. 47, No. Mar. 1998, pp. 35–43.
S. Ahn, "A Fast VP Restoration Scheme Using Ring–Shaped Sharable backup VPs", IEEE 1997, pp. 1383–1387.

* cited by examiner

*Primary Examiner*—Hassan Kizou
*Assistant Examiner*—Thai D Hoang
(74) *Attorney, Agent, or Firm*—Sughrue Mion, PLLC

(57) ABSTRACT

In a ring network system employing the transoceanic function, the path switching time in the protection process is made shorter.

From the path setting information, the determination process corresponding to the fault positions is created at the start-up time and path update time, and saved in the memory unit 23. This allows the switching information for faults to be uniquely determined, and the determination process portion increased by the transoceanic function can almost be eliminated. The switching time remains unchanged as compared with the conventional protection.

18 Claims, 11 Drawing Sheets

| SWITCH CHANNEL ID | OUTPUT CHANNEL ID | INPUT CHANNEL ID |
|---|---|---|
| NORMAL TIME | 1 | 7 6 9 |
| | ... | |
| | 1 5 3 6 | |
| WEST SPAN | 1 | 7 6 9 |
| | ... | |
| | 1 5 3 6 | |
| EAST SPAN | 1 | 7 6 9 |
| | ... | |
| | 1 5 3 6 | |
| WEST RING | 1 | 7 6 9 |
| | ... | |
| | 1 5 3 6 | |
| EAST RING | 1 | 7 6 9 |
| | ... | |
| | 1 5 3 6 | 7 6 9 |
| FAULT POSITION 1 | 1 | 7 6 9 |
| | 5 7 7 | 7 6 9 |
| FAULT POSITION 2 | ... | |

RING NETWORK SYSTEM, PROTECTION METHOD THEREFOR

BACKGROUND OF THE INVENTION

The present invention relates to a ring network system and a protection method therefor. More particularly, the invention relates to a ring network system which performs a path connection by a transoceanic function and a protection method therefor.

Generally, a ring network system is constructed by connecting a plurality of node elements (hereinafter referred to as NEs) by work lines and standby lines for protecting the work lines. And, a logical path is achieved by those physical work lines and standby lines.

Figure 8:
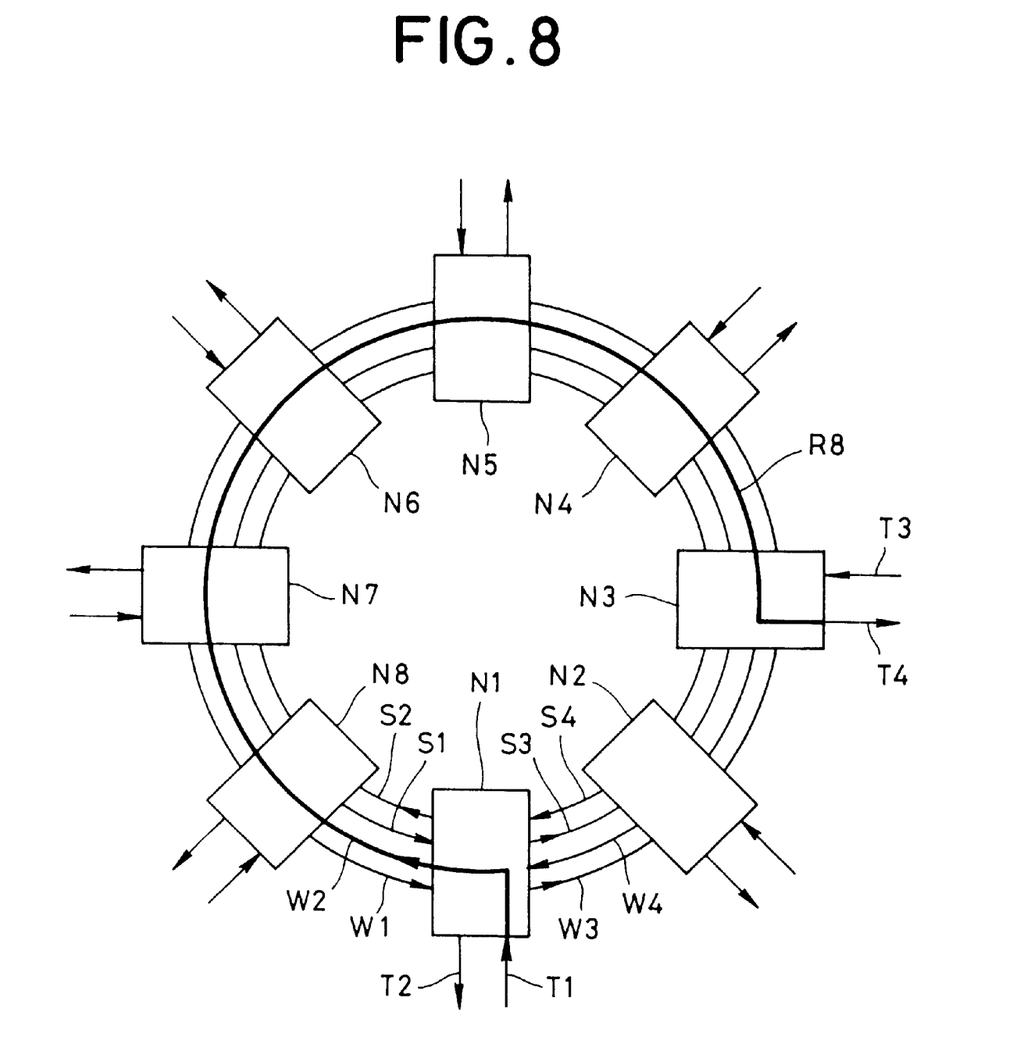
FIG. 8 is a block diagram showing the construction of the conventional ring network.

Now, reference is made to a ring network system having eight NEs N1–N8, as shown in FIG. 8. In this ring network system, to send frame data from NE N1 to NE N3, the frame data is sent sequentially through NE N8, NE N7, NE N6, NE N5, NE N4, and NE N3. In FIG. 8, a thick solid line shows a route R8 used in this case.

Further, in FIG. 8, to NE N1, input work lines W1 and W4, output work lines W2 and W3, input standby lines S1 and S4, output standby lines S2 and S3, and tributary lines T1 and T2 are connected, respectively. And, in the shown construction, a frame is sent from NE N1 to NE N3. In addition, NE N3 has tributary lines T3 and T4.

In brief, in the route R8 in FIG. 8, the tributary line T1 of NE N1 is an ADD line, while the tributary line T4 of NE N3 is a DROP Line.

Figure 9:
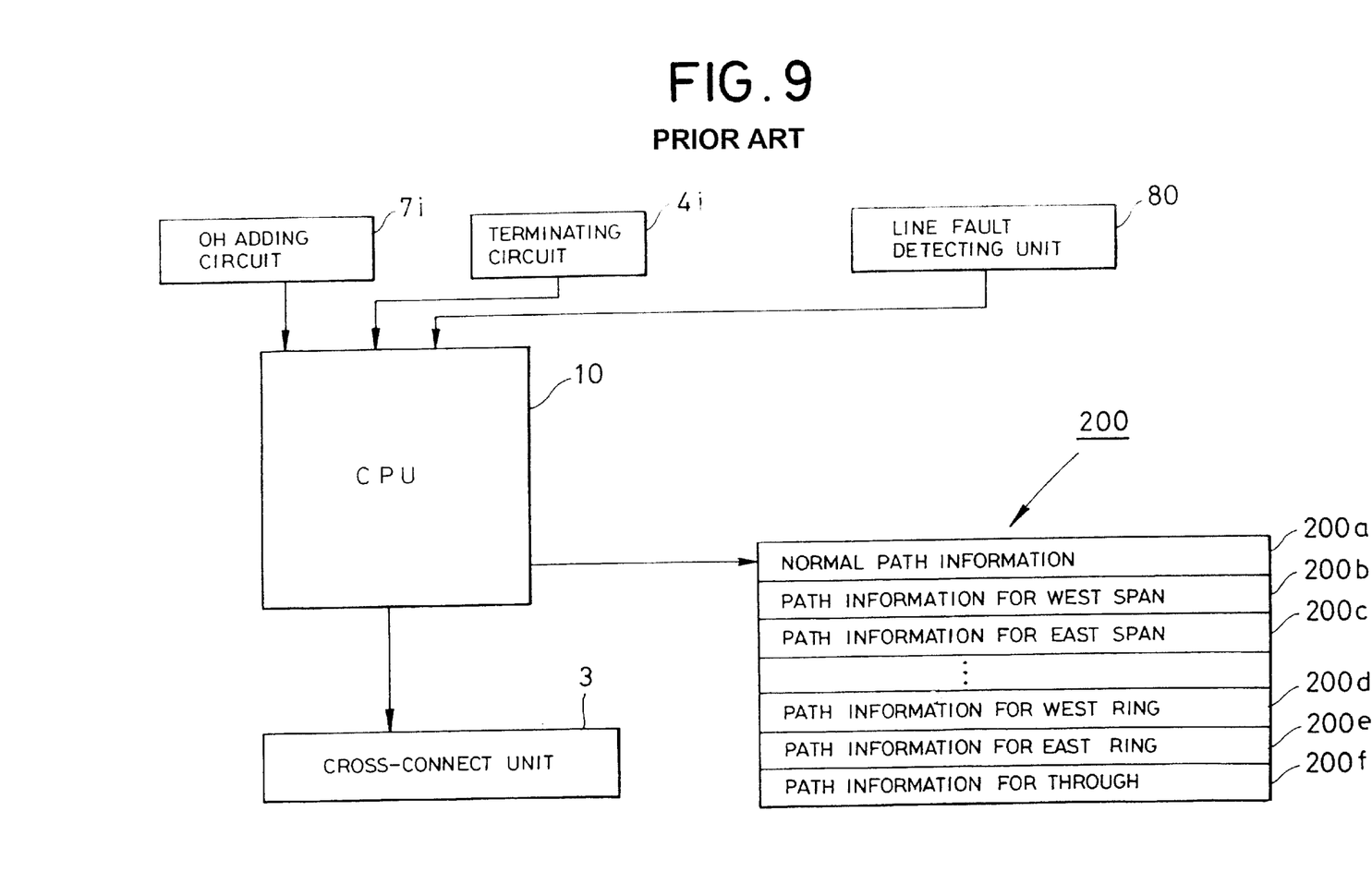
FIG. 9 is a diagram showing the functions of each NE constituting the conventional ring network system.

Each NE has functions such as shown in FIG. 9. Referring to FIG. 9, each NE comprises a terminating circuit 4i for terminating control signals called overhead (OH) or section overhead (SOH), an OH adding circuit 7i for adding new OH to a multiplexed signal, a line fault detecting circuit 80 for detecting a line fault, a cross-connect unit 3, a CPU 10 for controlling them, and a memory unit 200. On the other hand, the line fault detecting circuit 80 is provided in a photoreceiver circuit, not shown.

The CPU 10 performs the switching control of the cross-connect unit 3 by referencing a table stored in the memory unit 200. Namely, if no fault occurs, it carries out the switching control of cross-connect unit 3 according to the normal path information 200a stored in the memory unit 200. This allows the switching control of the cross-connect unit 3 to realize all routes between the NE per se and the other NEs in addition to the above described route R8.

Figure 10:
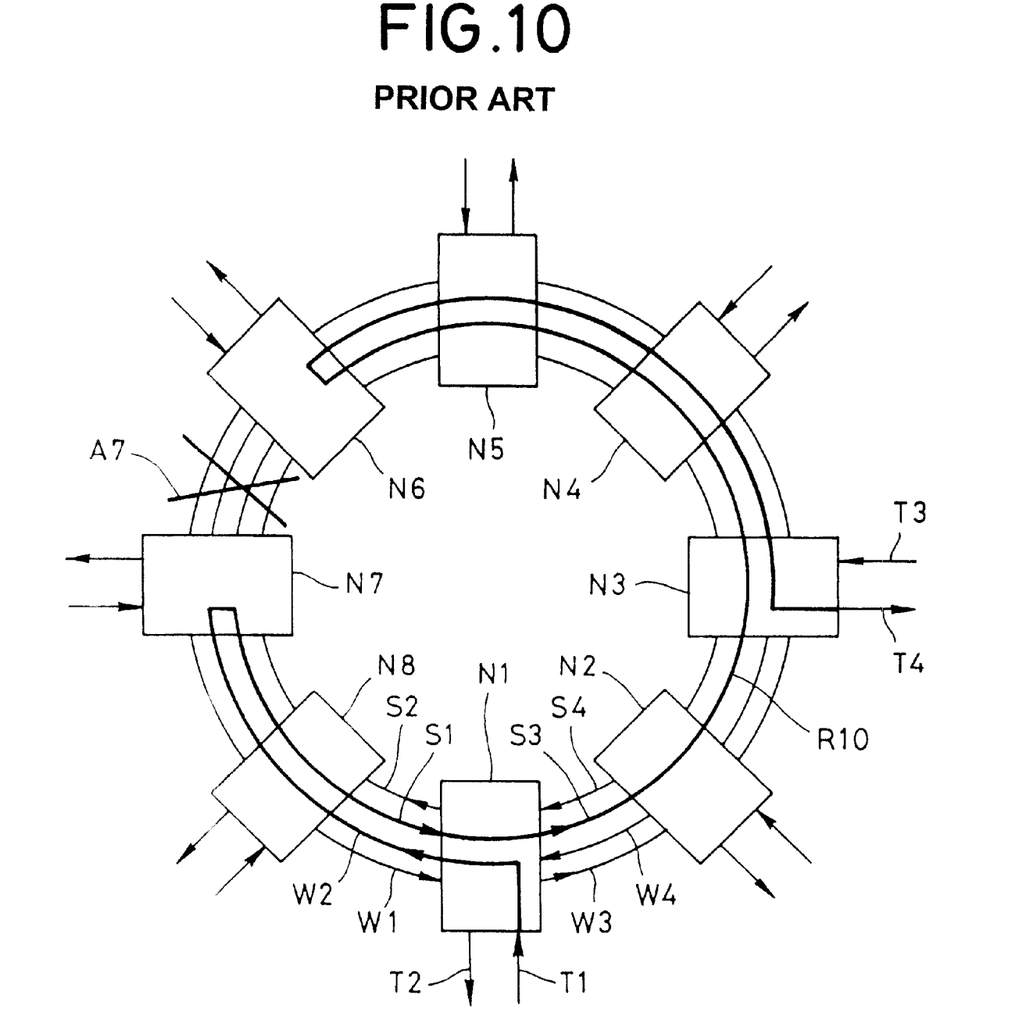
FIG. 10 is a diagram showing the protection process in the conventional ring network system.

On the other hand, if a fault occurs at any position in a ring network, a protection process is performed by referencing path information 200b for West Span, path information 200c for East Span, path information 200d for West Ring, path information 200e for East Ring, and path information 200f for through. For instance, if a fault A7 occurs between NE N6 and NE N7, as shown in FIG. 10, the above described route R8 cannot be realized, because the frame cannot pass through that portion. Thus, a route R10, shown by a solid line in FIG. 10, is achieved instead of the route R8.

To realize this route R10, the switching control of the cross-connect unit is performed as follows. First, when a frame is added from NE N1, NE N8 becomes through. Then, at NE N7, the East Ring for connecting the working line to the standby line is performed. This makes the route R10 to turn back at NE N7. After the turning back, NE N8, NE N1, NE N2, NE N3, NE N4, and NE N5 become through.

And, at NE N6, the West Ring for returning from the standby line to the original working line is performed. This allows the route R10 to turn back at NE N6. After the turning back, NE N5 and NE N4 again become through. Finally, the frame is dropped from NE N3. The above protection process allows each NE to continue the sending and receiving of frame data even if a fault occurs in part of the ring network.

The above described protection process ensues that each NE can continue the sending and receiving of frame data. However, there is a disadvantage that the route R10 shown by a solid line in FIG. 10 forms a long bypass.

Figure 11:
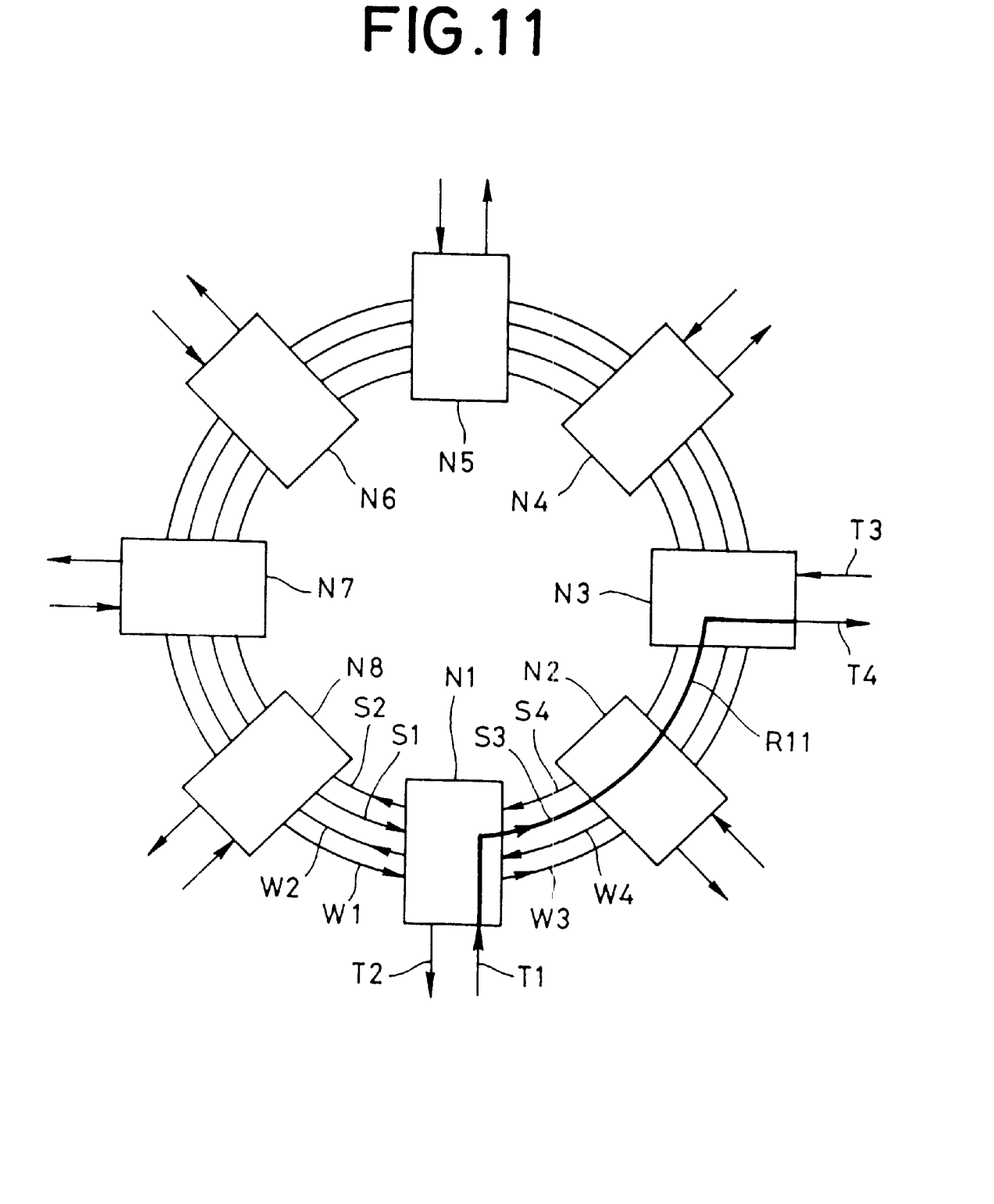
FIG. 11 is a diagram showing the transoceanic function in the ring network system.

As a function for solving this disadvantage, there is a transoceanic function. This function is to achieve the shortest path without going toward the position of the fault A7, as shown in FIG. 11. Namely, it is to realize a route R11 from NE N1 to NE N3, passing only NE N2, without passing through a long path like the route R10 shown in FIG. 10.

That is, when NE N1 to NE N8, which are a plurality of (16 at maximum) of multiplexers, form a ring network in FIG. 10, the signals of work lines W1 to W4 are remedied by turning back them using the standby lines S1 to S4 at NE N6 and NE N7 on both sides of the fault A7 in the conventional ring protection , as shown in FIG. 10. On the other hand, for the transoceanic function, the signals are salvaged by making a direct connection from NE N1, the signal input point, to NE N3, the output point, with the shortest distance, without making a bypass, as shown in FIG. 11.

As a specific switching process, in the conventional ring protection, through-switch is uniquely performed in which only the NE at the fault end performs a ring switch to turn back the work lines to the standby lines, with the other NEs releasing the standby lines for remedying the work lines and connecting the stand by lines on both sides. Namely, S1 is connected to S3, and S2 is connected to S4.

On the other hand, the transoceanic function requires a process in which, also at the NEs other than the NE at the faulty end, it is determined whether the fault has an effect on the ADD/DROP path of the local NE, and switching is performed if there is a path requiring a remedy. For this, an unconventional process is needed to always check the fault position, and apply a remedy according to the correlation between the fault position and the path. As a result, there is a disadvantage that the process becomes complex and the path switching time becomes longer.

SUMMARY OF THE INVENTION

The present invention was made to solve the above described disadvantages of the background art, and its object is to provide a ring network system in which the protection process has a shorter path switching time, a protection method therefor.

The ring network system according to the present invention is a ring network system in which, when a fault occurs, a path connection is performed by the transoceanic function for realizing the shortest path that does not go toward the fault position, wherein each node comprises a cross-connect portion for switching the connections between paths to realize a ring network;

a table having previously stored therein the correspondences between the fault occurring positions and the path switching information for connecting the local node and all the other nodes by the path connection by the transoceanic function, if a fault occurs at the positions; and a referencing portion for referencing said table in response to the occurrence of a fault to extract the path switching information corresponding to the fault occurring position, whereby the switching control of the cross-connect portion is performed according to the path switching information extracted as a result of the referencing by the referencing portion.

The protection method for a ring network system according to the present invention is a protection method in which, when a fault occurs in a ring network, a protection process by the transoceanic function is performed for realizing the shortest path that does not go toward the fault position, the method comprising:

a referencing step for referencing a table having previously stored therein the correspondences between the fault occurring positions in the ring network and the path switching information for connecting the local node and all the other nodes by the path connection by the transoceanic function if a fault occurs at the positions, thereby to extract the path switching information corresponding to the fault occurring position; and a step for performing the switching control of the cross-connect portion according to the path switching information extracted as a result of the referencing by the referencing step.

The recording medium having recorded thereon a program for executing a protection process according to the present invention is a recording medium having recorded thereon a program for causing a computer to execute the protection process in a ring network, the program comprising:

a referencing step for referencing a table having previously stored therein the correspondences between the fault occurring positions in the ring network and a path switching information for connecting the local node and all the other nodes by the path connection by the transoceanic function if a fault occurs at the positions, in response to the occurrence of a fault, thereby to extract the path switching information corresponding to the fault occurring position; and a step for performing the switching control of the cross-connect portion according to the path switching information extracted as a result of the referencing by the referencing step.

To summarize, the present invention can freely perform the cross-connect connection and multiplexing of a low-speed signal called pass, and it is applied in a system in which ADD/DROP multiplexers for inputting/outputting signals on a high-speed transmission path, called a line, are making up a ring network. And, to realize the transoceanic function, the path information corresponding to fault positions are previously increased. The path information is generated at the system start-up time or when the pass setting information is updated. When a fault occurs, the path information is referenced to select appropriate path information corresponding to the position at which the fault has occurred.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Now, an embodiment of the present invention is described with reference to the drawings.

Figure 2:
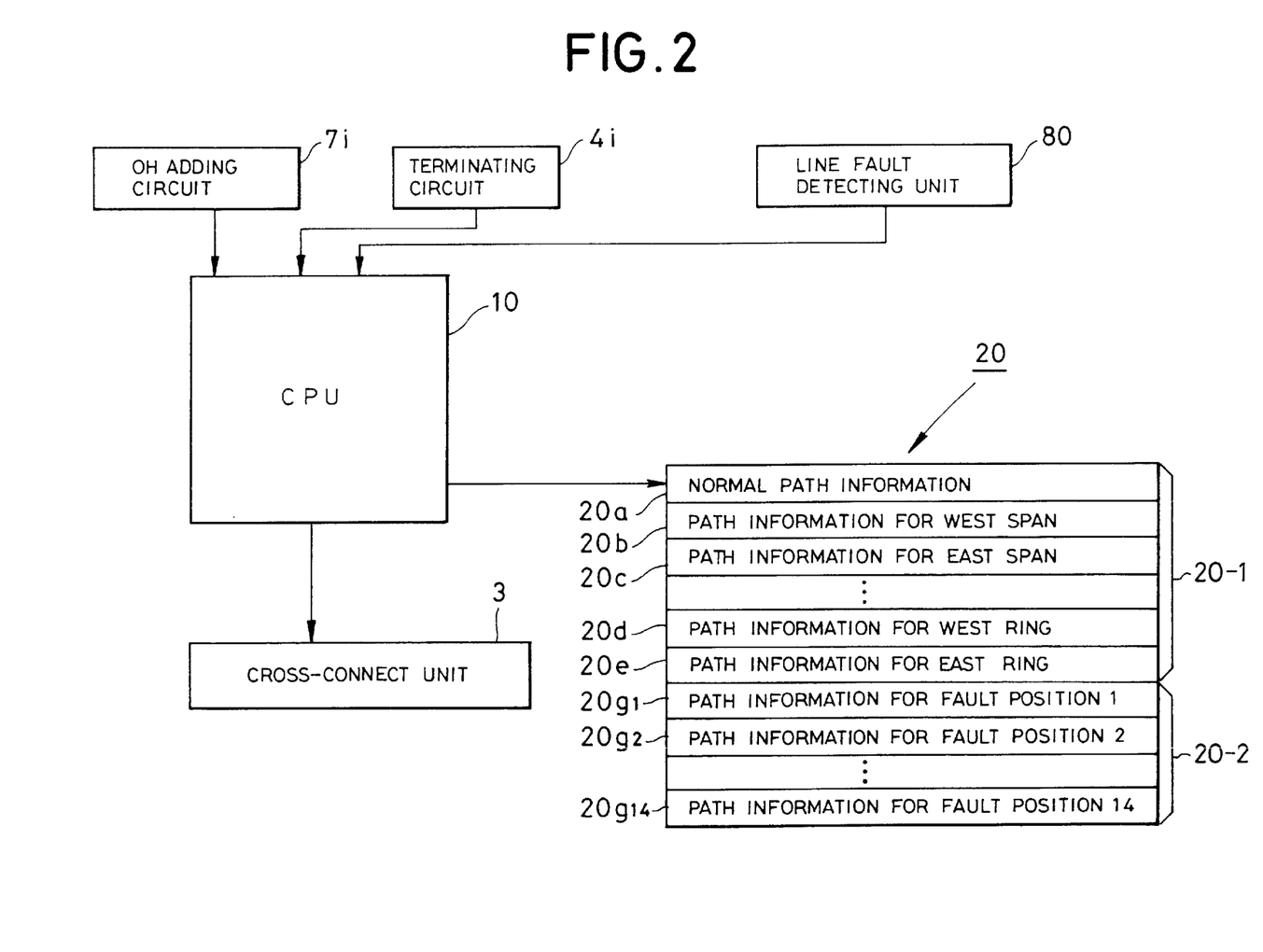
FIG. 2 is a diagram showing the functions of each NE constituting the ring network system according to the present invention.

FIG. 2 is a diagram showing the functions of each NE constituting the ring network system according to the present invention. In FIG. 2, the portions identical to FIG. 9 are shown by the same symbols, and the detailed description of those portions is omitted. In FIG. 2, the difference between the conventional NE is that the path information corresponding to fault positions is previously stored in a memory unit 20. Namely, each NE constituting the present system has information 20-2 forming a table having previously stored therein information showing the correspondences between the fault occurring positions and the path switching information for connecting the local NE and all the other NEs if a fault occurs at the positions. That is, the memory unit 20 has the information 20-2 newly added in the present invention, in addition to the conventional information 20-1.

In this example, since the maximum number of NEs making up the ring network is 16, the number of the paths between the respective NEs is also 16. Accordingly, 16 fault points can be considered. However, as to the two fault positions adjacent to the local NE, the occurrence of a fault is detected by a line fault detecting unit 80, as in the conventional system. Thus, path information 20g1 to 20g14 on the 14 fault positions excluding the above two points is previously stored in the memory unit 20.

Up to the present, each NE has only the switching information for the occurrence of a failure on the adjacent lines. In the present system, switching information corresponding to the fault positions is also provided. When the apparatus is started up, or when the path setting information is updated, the path setting information is previously analyzed to store the switching information corresponding to the fault positions in the memory. In this case, the information showing the correspondences between the fault occurring positions and the path switching information for connecting the local NE to all the other NEs by the path connection by the transoceanic function if a fault occurs at the position, is previously stored as a table in the memory. Namely, the switching information uniquely determined by the fault position is preset. Since it is only needed to reference the previously created table, no complex process is required, and the path switching time is not extended.

Figure 1:
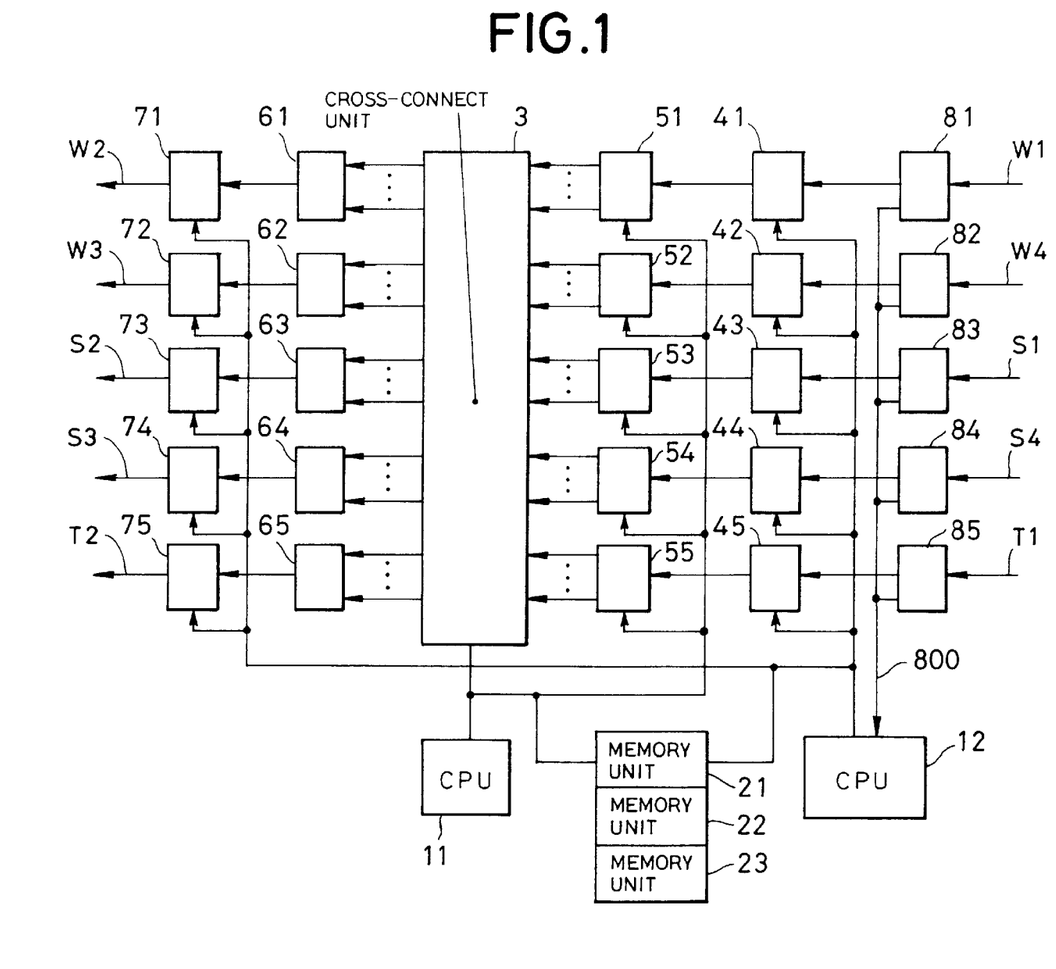
FIG. 1 is a block diagram showing an example of the construction of each node constituting the ring network system according to an embodiment of the present invention.

Here, the construction of the main portions of a NE in the ring network is shown in FIG. 1. On the other hand, it is assumed that each NE in the ring network has a similar construction.

In FIG. 1, the NE comprises photoreceiver circuits 81–85 for receiving multiplexed input signals W1, W4, S1, S4, and T1, terminating circuits 41–45 for terminating the respective received signals and a control signal called overhead, isolation circuits 51–55 for isolating an input signal into low-speed signals, a cross-connect unit 3 for cross-connecting the isolated signals, multiplexer circuits 61–65 for multiplexing the cross-connected signals, OH adding circuits 71–75 for adding new OH to the multiplexed signal, CPUs 11 and 12 for controlling these, and memory units 21–23.

In the memory unit 21, the initial value at the start-up time and path information set in the cross-connect unit 3 are stored. In the memory unit 22, the switching information for failure to be set if the local NE is the fault end in the normal protection is stored for each fault type. Further, the memory 23 is provided in the present system for storing the switching information corresponding to the fault positions. However, the memory units 22 and 23 are only needed to be logically distinguished. The memory unit 21 is accessed from both of the CPUs 11 and 12, and used for information transmission.

In such arrangement, the conventional path setting of the ring network is as follows. That is, normally, the connection is made on a work line (input signals W1, W4) to work line (output signal W3, W2) basis. And, at the time of failure, a setting is made in the cross-connect unit 3 so that the signal is switched and connected on a work line (input signals W1, W4) to standby line (output signal S3, S2) basis by switching information.

A SDH (Synchronous Digital Hierarchy) frame and SONET (Synchronous Optical Network) are received by the photoreceivers 81–85, and inputted to the corresponding terminating circuits 41–45. From the line fault detecting units, not shown, in the photoreceivers 81–85, information 800 showing the presence or absence of faults is outputted, and the information 800 is inputted to the CPU 12. Thus, the fault having occurred on a transmission line adjacent to the local NE can be detected by the CPU 12.

When a fault has occurred at a position adjacent to the local NE, the CPU 12 detects the fault and informs the CPU 11 of the switching, and notifies the OH adding circuits 71–75 to set the identification information (ID) and the switching status of the NE per se in the bytes K1 and K2.

On the other hand, when a fault is detected, the identification information (ID) of the NE for which the fault has been detected, and the switching state according to the fault are set in the bytes K1 and K2 in the OH terminated in the terminating circuits 41–45. The bytes K1 and K2 are always monitored by the CPU 12. Accordingly, if a fault occurs at a position other than the adjacent lines, by monitoring the bytes K1 and K2, it can be known the information transmitted from other NEs and occurrence of the fault. Since the ID is uniquely set for each NE of the ring network, the fault position can be determined by the ID.

Now, the operation of each NE is described with reference to the flowchart of FIG. 3.

When the system is started or the path setting information is updated, the CPU 11 reads in the path setting status from the memory unit 21, and based on this information, creates the switching information for the occurrence of a fault on the adjacent lines according to the fault type, and stores it in the memory unit 22 (step S31). The creation and storage of the switching information is performed in a manner similar to the conventional system. Further, in the present system, the switching information according to the fault position is created and stored in the memory unit 23 (step S32). According to the switching information created and stored by the above steps S31 and S32, path information is set in the cross-connect unit 3 (step S33).

With this state, the presence or absence of a fault is monitored. That is, the fault on an adjacent line can be detected by the above described line fault detecting unit (step S34). Further, the fault having occurred on a line other than the adjacent lines can be detected by checking the contents of the above described bytes K1 and K2 (step S35).

If a fault occurs on an adjacent line, the CPU 12 adds this information to the bytes K1 and K2 through the OH adding circuit to transmit it to other NEs (step S34→S37). At the same time, it communicates this information to the CPU 11, and references the memory unit 22 to retrieve the switching information, as in the conventional protection process (step S38). And, based on the retrieved information, path information is set in the cross-connect unit 3 (step S38→S33).

On the other hand, in the implementation of the transoceanic function, if a fault occurs on a line other than the adjacent lines and the information on that is transmitted by the bytes K1 and K2 obtained in the terminating circuits, the information indicating the fault position is notified from CPU 12 to the CPU 11 in the particular NE (step S35→S36). The CPU 11 references the memory unit 23 on the basis of the information indicating the fault position, and retrieves the switching information (step S36). And, based on the retrieved switching information, path information is set in the cross-connect unit 3 (step S36→S33).

In the above operation, a fault only on a work line requires the switching process unique to the fault, which dose not cause other NEs to perform a switching. Accordingly, for this switching information, the conventional one can be directly used. For this, the switching information is separately stored in the memory unit 22 and memory unit 23, depending on whether the switching information is related to an adjacent line fault or a non-adjacent line fault.

In the conventional protection process, the path switching is performed only by the fault end for each line, and the NEs other than the fault end only uniquely through-connect the standby lines, without performing the path switching. On the other hand, in the transoceanic function, the input and output of the path are connected with the shortest length, and thus, even if the fault is not adjacent, a switching must be performed to connect the path from the work line to the standby line if the fault affects the path inputted or outputted at the NE per se.

That is, to compare with the conventional protection process, upon the occurrence of a fault, it is required that all the NEs analyze the fault to check the existence of the effect of it for each path, and perform the switching. In this case, this determination process takes much time since the number of paths for one line is considerably large. Accordingly, the time from the occurrence of a fault to the completion of the switching would be long if this determination is made in real time and switching information is created.

Thus, in the present system, the determination process according to the fault position is created at the startup time or at the updating of the path setting information on the basis of the path setting information, and stored in the memory unit, thereby to uniquely determine the switching information for faults. Since this can almost eliminate the determination process portion increased by the transoceanic function, the switching time remains unchanged as compared with the conventional protection.

Further, if the transoceanic function utilizing the present invention is mounted, the extension as to the fault position can also be considered to be an extension of the types of faults in the viewpoint of internal process. In this case, it is only needed to extend the parameters, and no change is required in the internal routine for path setting if the switching information is increased by the number of parameters. Accordingly, it can be mounted as an additional function if the memory is physically enough.

Figure 3:
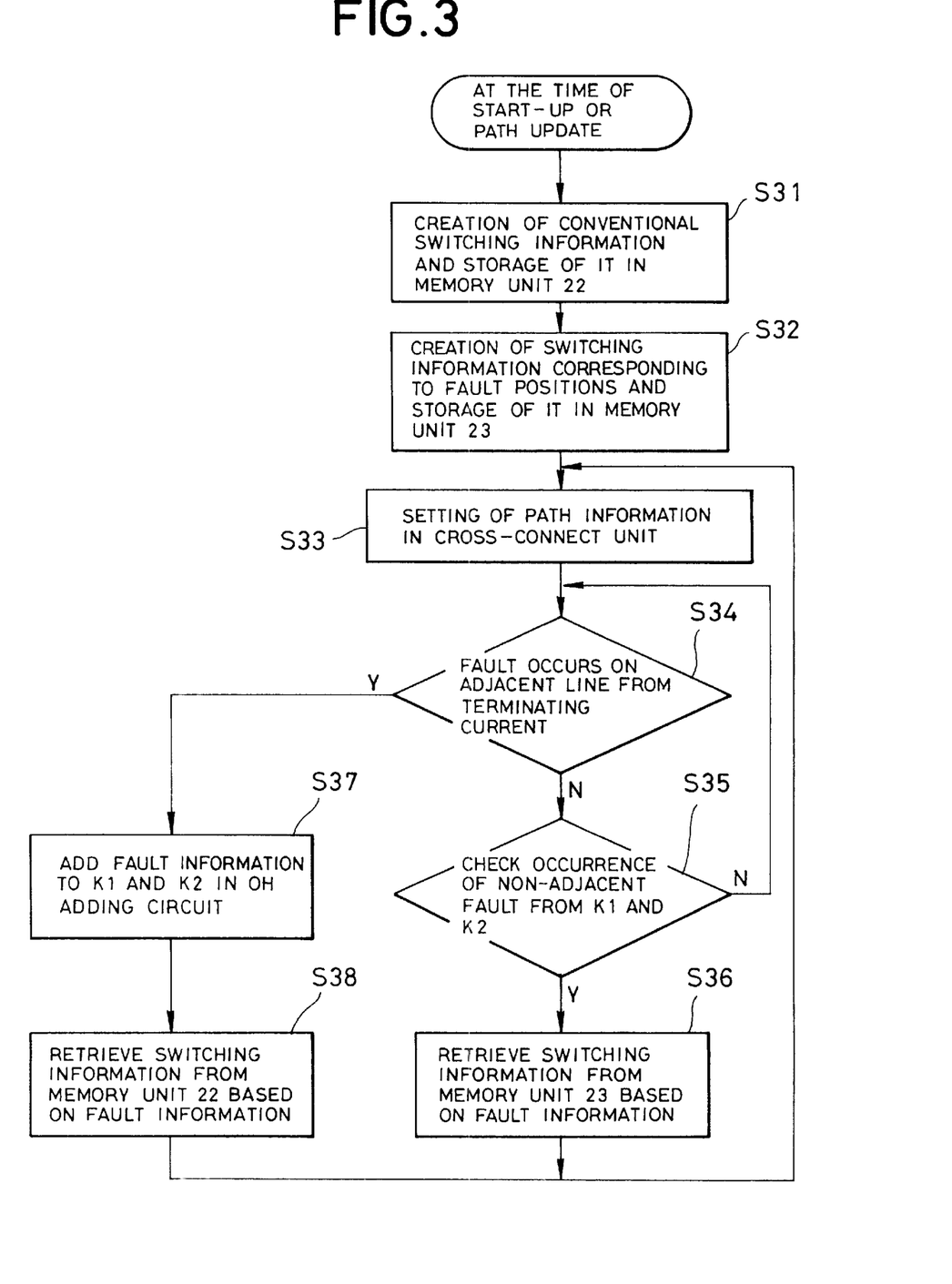
FIG. 3 is a flowchart showing the operation of each node constituting the ring network system according to an embodiment of the present invention.

In addition, if a recording medium having recorded thereon a program for implementing the above described process of FIG. 3, and it is used to control a computer, then, obviously, a protection operation similar to the above described one can be performed. As this recording medium, various recording media such as a semiconductor memory, and a magnetic disk unit, not shown in FIG. 1, can be used.

Figure 4:
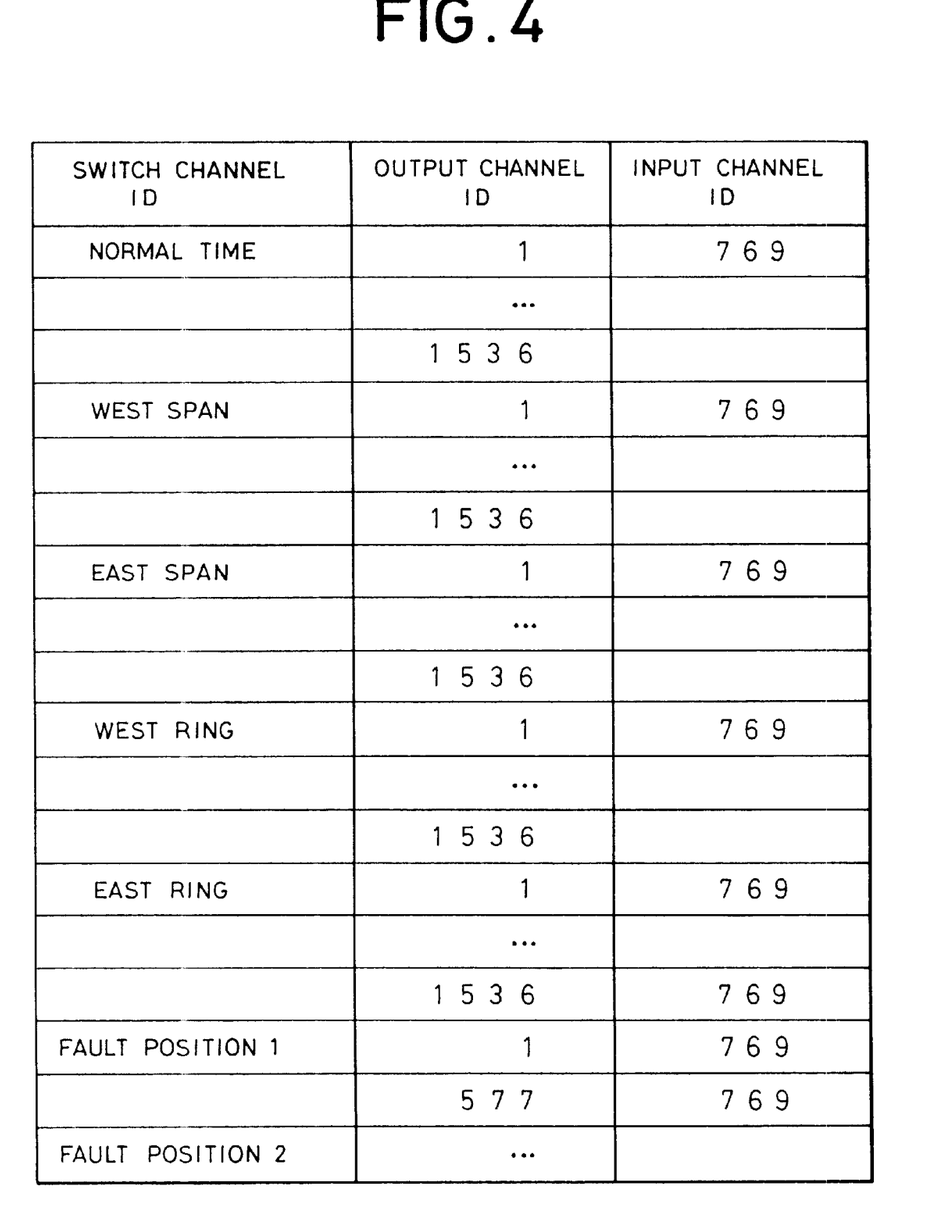
FIG. 4 is a diagram showing an example of the switching information stored in the memory unit of each node constituting the ring network system according to an embodiment of the present invention.

Now, description is made to an example of the switching information stored in the memory units 21–23 with reference to FIG. 4. As shown in FIG. 4, in the memory units 21–23, information showing the correspondences between the output channel IDs and the input channel IDs for each switch channel ID is stored.

"Normal time" of the switch channel ID shown in FIG. 4 is information showing the correspondences between the output channel IDs and the input channel IDs in the normal operation in which no fault occurs. In FIG. 4, items of the output channel IDs "1" to "1536" are shown. And, the output channel ID "1" corresponds to the input channel ID "769".

Further, "West Span" of the switch channel ID is information showing the correspondences between the output channel IDs and the input channel IDs in the West Span operation of the particular NE. In FIG. 4, items of the output channel IDs "1" to "1536" are shown. And, the output channel ID "1" corresponds to the input channel ID "769". Similarly, "East Span" of the switch channel ID, "West Ring" of the switch channel ID, and "East Ring" of the switch channel ID are information showing the correspondences between the output channel IDs and the input channel IDs in the East Span operation, West Ring operation, and East Ring operation, respectively.

Figure 5A:
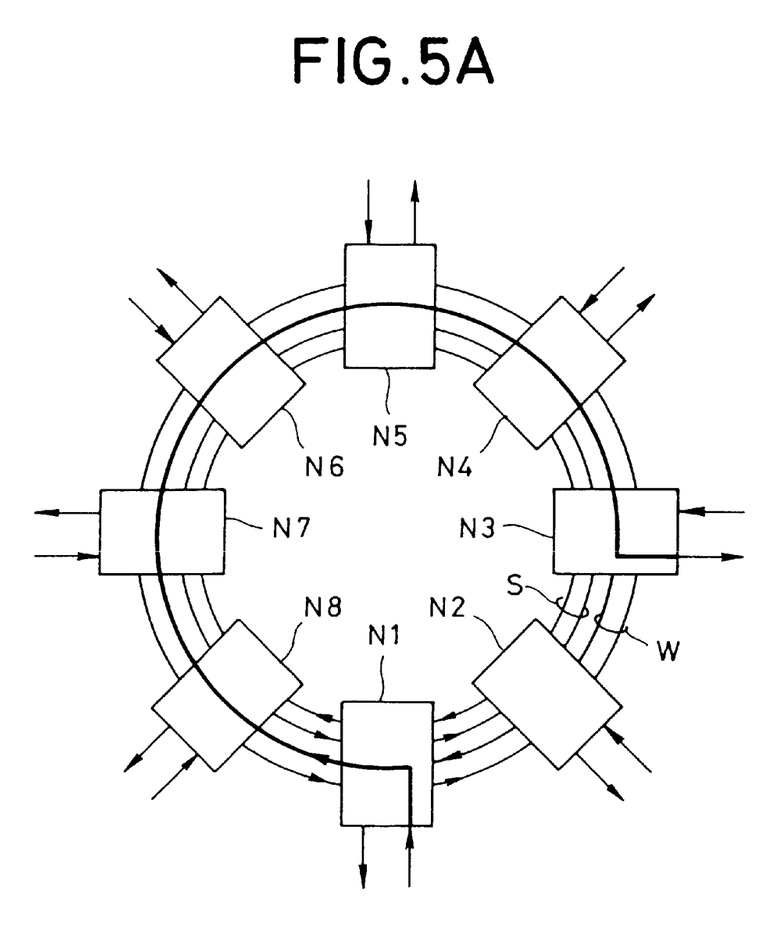
FIG. 5A is a block diagram showing the inputs/outputs of each node constituting the ring network system.
Figure 5B:
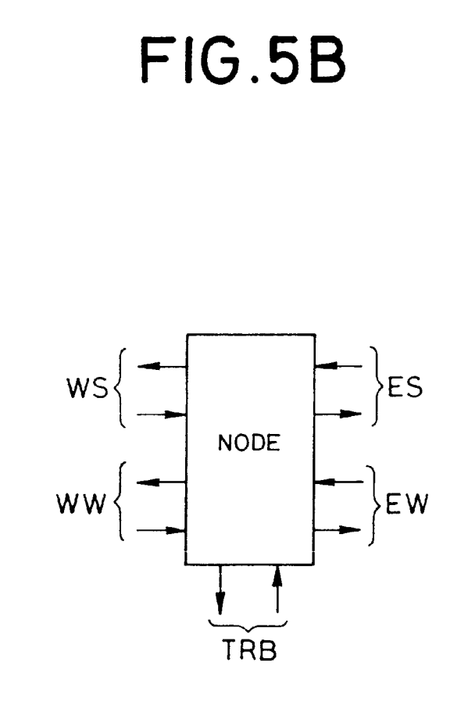
FIG. 5B is a diagram showing the inputs/outputs of each node constituting the ring network system.

It is assumed that, as shown in FIG. 5A, a working line W and a standby line S, connect the respective NES NE1–NE8. And, as shown in FIG. 5B, it is assumed that the individual NEs N1–N8 have a west working line WW, east working line EW, west standby line WS, and east standby line ES in addition to a tributary line TRB. The West Span is a switching information for performing a protection process to switch the west working line WW on the West side to the west standby line WS. The East Span is a switching information for performing a protection process to switch the east working line EW on the East side to the east standby line ES. The West Ring is a switching information for performing a protection process to turn back a path on the West side. East Ring is a switching information for performing a protection process to turn back a path on the East side.

Figure 6A:
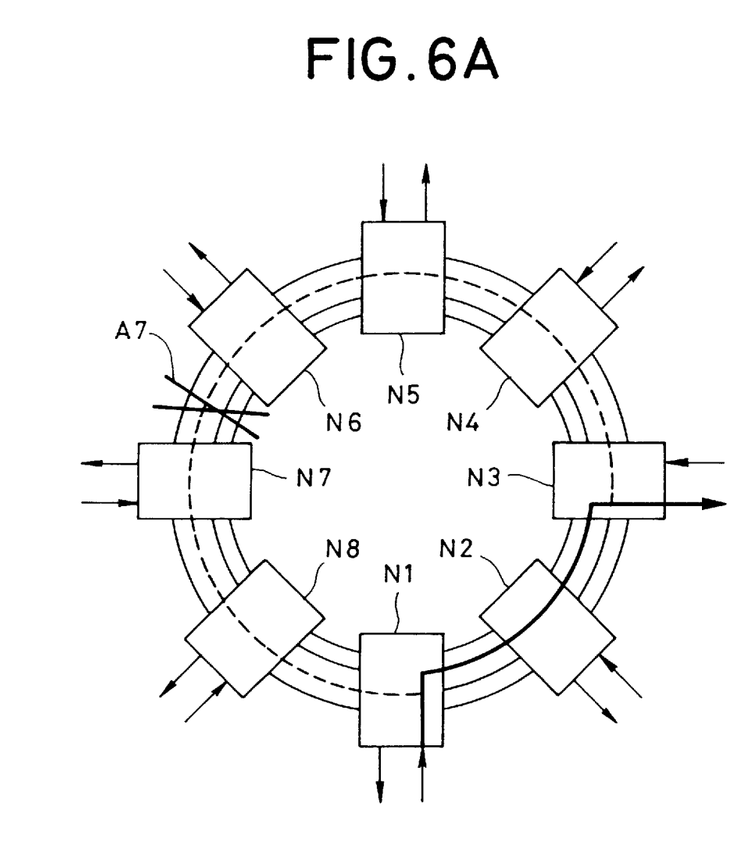
FIG. 6A is a diagram showing a path requiring a route change when realizing the transoceanic function.
Figure 6B:
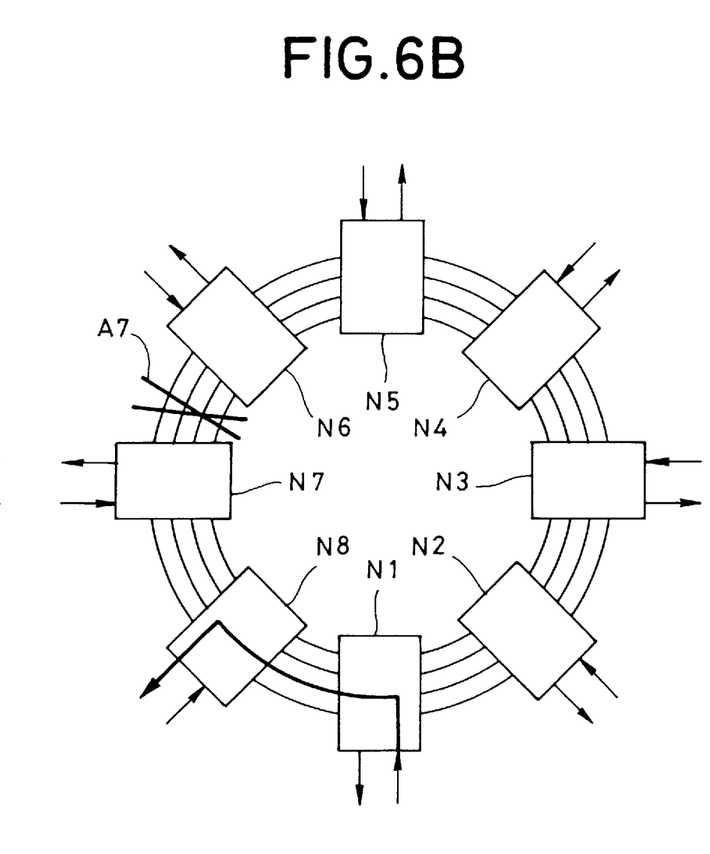
FIG. 6B is a diagram showing a path requiring no route change when realizing the transoceanic function.

Returning to FIG. 4, "Fault position 1" of the switch channel ID indicates path switching information for the occurrence of a fault at a certain position in the ring network, and it is information showing the correspondences between the output channel IDs and the input channel IDs. In this case, some paths require a route switching from the broken-line route to the solid-line route, as shown in FIG. 6A, and other paths require no route switching, as shown in FIG. 6B. Thus, the switching information is stored in the memory unit according to whether a route switching is required when a fault occurs at the fault position 1 as seen from the NE per se. On the other hand, also for the "Fault position 2" of the switch channel ID and the subsequent items, switching information is similarly stored in the memory unit.

Since the path switching is performed by referencing the switching information previously stored in the memory unit, the determination process portion increased by the transoceanic function can almost be eliminated, and thus the switching time remains unchanged as compared with the conventional protection.

Now, the application examples of the above described ring network system are described.

Figure 7:
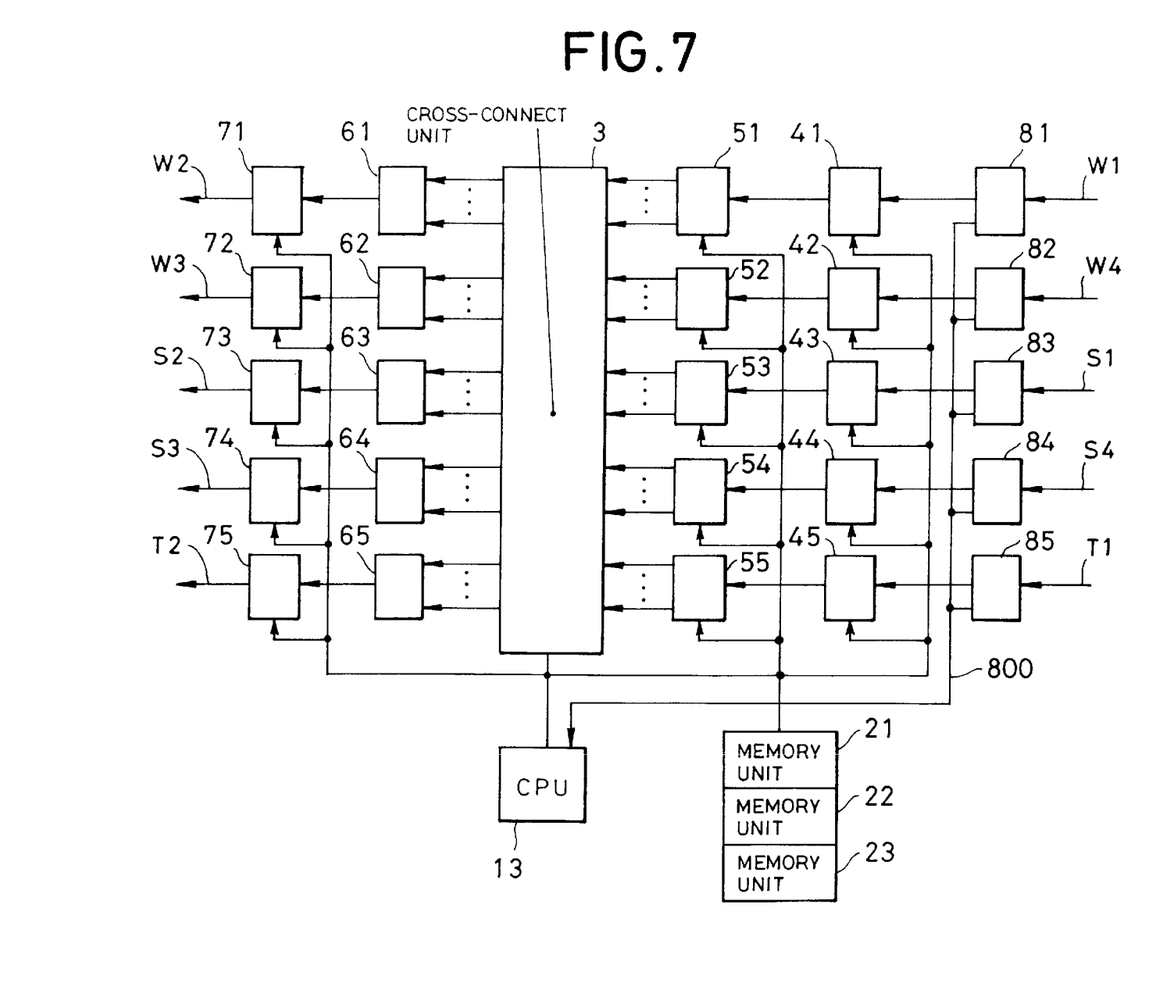
FIG. 7 is a block diagram showing an example of the construction of each node constituting the ring network system according to another embodiment of the present invention.

First, the first application example is described. In this application example, the two CPUs in FIG. 1 are replaced by one CPU 13, as shown in FIG. 7. In this case, all the control lines are connected to the CPU 13. In FIG. 7, the portions identical to FIG. 1 are shown by the same symbols.

A dual-CPU construction is provided in FIG. 1 to share the functions, as well as to enable the CPU 12 to always monitor the terminating circuits even if the CPU 11 is performing a work such as path setting, so that it can respond in real time when a fault occurs. However, by using a high-speed CPU, this can be done by one CPU 13, as shown in FIG. 7. Since only one CPU is used, there is an advantage that the mount space can be saved and the apparatus can be downsized. Further, the cost can be reduced because the number of CPUs is small. Moreover, software bugs can be avoided because communication is not performed between CPUs.

The second application example is described below. In this application example, the memory units 22 and 23 shown in FIG. 1 are logically integrated into one. To have switching information corresponding to fault positions means to have also the information for the case in which the NE per se is the fault end. In this case, the memory unit 22 having stored therein the switching information for the current protection method is also included. Thus, the memory units 22 and 23 can be integrated into one, logically. However, since there is the switching unique to the fault end, an extension as to the fault type is necessary. The second application example, it can easily be applied to the conventional apparatus. That is, since the normal protection function and the transoceanic function are not clearly separated, a table can be created if the parameters specifying the conventional information is extended (if the maximum value is increased). So the construction becomes easy, and it can easily be applied to the conventional apparatus if it has enough capacity of the memory.

Further, the third application example is described. The internal processing is not largely changed between the conventional protection function and the transoceanic function. For this, this application example has a flag to determine these functions. This allows these functions to be changed without changing the construction. However, since the path connection pattern for the switching may differ between the conventional protection function and the transoceanic function, it is needed to update the switching information according to the function when the function is changed. The third application example is not only easy to apply to the conventional apparatus as is the second application example, but also it has an advantage that the conventional protection function and the transoceanic function can be switched by the user according to the usage, eliminating the purchase of another apparatus.

The fourth application example is now described. In the above description, the switching information corresponding to fault positions is provided to realize the transoceanic function. To provide a table having stored therein the switching information can also be used for a purpose other than the realization of the transoceanic function. For instance, an independent emergency path can be generated and set, ignoring the normal path switching rule, only if a fault occurs on a certain line or path. Thus, a path limited only to the fault position can also be provided without considering the initial path setting. The fourth application example has an advantage that a protection path corresponding to the fault position can be prepared in addition to the transoceanic function.

Although the above description has been made to the ring network in which data transmission is carried by SDH or SONET, it is obvious that the present invention is not limited to this and it can be applied to various ring networks.

The following advantages can be obtained by applying the present system to a ring network. Namely, whether or not the fault affects the incoming and outgoing paths of the NE per se must be determined as many times as the number of paths for each line, thereby to perform the switching to standby lines or through-connect standby lines. The determination process is a high-load work for the CPUT and the processing time becomes longer as the number of paths increases. Accordingly, it is fatal to the transmission apparatus that must always suppress the switching time to the minimum.

On the other hand, in an application in which the inputs and outputs of a path are not always be connected by simple PEER-To-PEER, various determination processes are further added in addition to the mere switching, which leads to increases in the processing time and switching time.

Thus, to make the switching time shortest, it is needed to eliminate the determination process as much as possible, or an idea of previously creating the switching information as in the present system is required. By previously creating the switching information, a protection process having a shorter path switching time can be achieved.

As described above, in the present invention, by previously creating the determination process according to a fault position from the path setting information and storing it in a table, an advantage is provided that the switching information for a fault can be uniquely determined to shorten the path switching time in the protection process in a ring network system employing the transoceanic function.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A ring network system in which, when a fault occurs, a path connection is performed by the transoceanic function for realizing the shortest path that does not go toward the fault position, wherein each node comprises a cross-connect portion for switching the connections between paths to realize a ring network;

a table having previously stored therein the correspondences between fault occurring positions and the path switching information for connecting the local node and all the other nodes by the path connection by said transoceanic function if a fault occurs at the positions; and a referencing portion for referencing said table in response to the occurrence of a fault to extract the path switching information corresponding to said fault occurring position, whereby the switching control of said cross-connect portion is performed according to the path switching information extracted as a result of the referencing by said referencing portion.

2. A ring network system as set forth in claim 1, wherein said referencing portion detects the occurrence of a fault by the generation of a path switching request, and references said table in response to the detection.

3. A ring network system as set forth in claim 1, wherein said referencing portion detects the occurrence of a path switching request by the bytes K1 and K2 in the section overhead portion in a transmission frame.

4. A ring network system as set forth in claim 1, wherein said ring network comprises the current work lines and backup standby lines.

5. A ring network system as set forth in claim 1, wherein said table creates information showing said correspondences at the time of starting the system.

6. A ring network system as set forth in claim 1, wherein said table creates information showing said correspondences at the time of path updating.

7. A protection method in which, when a fault occurs in a ring network, a protection process by the transoceanic function is performed for realizing the shortest path that does not go toward the fault position, said method comprising:

a referencing step for referencing a table having previously stored therein the correspondences between the fault occurring positions in said ring network and path switching information for connecting the local node and all the other nodes by the path connection by said transoceanic function if a fault occurs at the positions, in response to the occurrence of a fault, thereby to extract the path switching information corresponding to said fault occurring position; and a step for performing the switching control of cross-connect portion according to the path switching information extracted as a result of the referencing by said referencing step.

8. A protection method as set forth in claim 7, wherein said referencing step detects the occurrence of a fault by the generation of a path switching request, and references said table in response to the detection.

9. A protection method as set forth in claim 7, wherein said referencing step detects the generation of a path switching request by the bytes K1 and K2 in the section overhead portion in a transmission frame.

10. A protection method as set forth in claim 7, wherein said ring network comprises the current working lines and the backup standby lines.

11. A protection method as set forth in claim 7, wherein said table creates information showing said correspondences at the time of starting the system.

12. A protection method as set forth in claim 7, wherein said table creates information showing said correspondences at the time of path updating.

13. A recording medium having recorded thereon a program for causing a computer to execute a protection process in a ring network system, said program comprising:

a referencing step for referencing a table having previously stored therein the correspondences between the fault occurring positions in said ring network and a path switching information for connecting the local node and all the other nodes by the path connection by said transoceanic function if a fault occurs at the positions, in response to the occurrence of a fault, thereby to extract the path switching information corresponding to said fault occurring position; and a step for performing the switching control of said cross-connect portion according to the path switching information extracted as a result of the referencing by said referencing step.

14. A recording medium as set forth in claim 13, wherein said referencing step detects the occurrence of a fault by the generation of a path switching request, and references said table in response to the detection.

15. A recording medium as set forth in claim 13, wherein said referencing step detects the generation of the path switching request by the bytes K1 and K2 in the section overhead in a transmission frame.

16. A recording medium as set forth in claim 13, wherein said ring network comprises the current working lines and the backup standby lines.

17. A recording medium as set forth in claim 13, wherein said table creates information showing said correspondences at the time of starting the system.

18. A recording medium as set forth in claim 13, wherein said table creates information showing said correspondences at the time of path updating.

* * * * *